United States Patent
Ma

(10) Patent No.: US 11,027,609 B1
(45) Date of Patent: Jun. 8, 2021

(54) STEERING WHEEL

(71) Applicant: Jui-Yueh Ma, New Taipei (TW)

(72) Inventor: Jui-Yueh Ma, New Taipei (TW)

( * ) Notice: Subject to any disclaimer, the term of this patent is extended or adjusted under 35 U.S.C. 154(b) by 0 days.

(21) Appl. No.: 16/749,809

(22) Filed: Jan. 22, 2020

(51) Int. Cl.
  *B60K 35/00* (2006.01)
  *B62D 1/06* (2006.01)
  *B60Q 5/00* (2006.01)
  *G06F 3/0484* (2013.01)

(52) U.S. Cl.
  CPC .............. *B60K 35/00* (2013.01); *B60Q 5/005* (2013.01); *B62D 1/06* (2013.01); *G06F 3/04847* (2013.01); *B60K 2370/152* (2019.05); *B60K 2370/157* (2019.05); *B60K 2370/167* (2019.05); *B60K 2370/52* (2019.05); *B60K 2370/782* (2019.05)

(58) Field of Classification Search
  None
  See application file for complete search history.

(56) References Cited

U.S. PATENT DOCUMENTS

| 6,121,692 | A * | 9/2000 | Michaels | B60R 16/027 307/10.1 |
| 10,282,923 | B2 * | 5/2019 | Tieman | G07C 5/08 |
| 2008/0061954 | A1 * | 3/2008 | Kulas | B60K 35/00 340/438 |
| 2013/0332844 | A1 * | 12/2013 | Rutledge | G06F 3/0484 715/744 |
| 2015/0253922 | A1 * | 9/2015 | Goodlein | G09G 3/36 345/173 |
| 2016/0066127 | A1 * | 3/2016 | Choi | H04W 12/003 455/41.2 |
| 2017/0144688 | A1 * | 5/2017 | Pitzer | B60Q 3/283 |
| 2017/0291493 | A1 * | 10/2017 | Bostick | B60Q 9/00 |

* cited by examiner

*Primary Examiner* — Christopher J Fibbi
(74) *Attorney, Agent, or Firm* — Rabin & Berdo, P.C.

(57) ABSTRACT

A steering wheel according to the present invention for showing a plural driving information comprises: a display device including a screen, an operation device for outputting an operation instruction and a host. The host comprises an interface generating device connected to a storage unit, and connects to an Electronic Control Unit of a vehicle to obtain driving information. After receiving the driving information and the operation instruction input by the user through an operation device, the interface generating device divides the driving information into a plural shown information and hidden information, the shown information is added to a custom page transmitted to the display device, so that the screen shows the custom page and selected driving information.

1 Claim, 3 Drawing Sheets

STEERING WHEEL

FIELD OF THE INVENTION

The present invention relates to a steering wheel, and more particularly, to a steering wheel having a display screen and capable of controlling the information displayed on the display screen.

BACKGROUND

Vehicles are important means of transportation in life. Wherein, in order to help drivers understand the condition of their vehicles, such as speed, engine RPM, whether lights are activated, the vehicle will be equipped with a dashboard to display the above information. However among them, currently the types of information that can be displayed on the dashboard of a vehicle (hereinafter referred to as driving information) are mostly limited by the design of the dashboard itself, and it may not be suitable for everyone's driving habits. Therefore, there is a need for a dashboard allowing users themselves to set displayed driving information.

SUMMARY

The main purpose of the present invention is to provide a steering wheel, which comprises a screen, an input device and a host receiving the driving information of a vehicle. The host has an interface generating device which allows a user oneself to set the driving information displayed on the screen.

To achieve the above purpose, a steering wheel according to the present invention used for showing a plurality of driving information comprises: a display device, an operation device and a host.

The display device comprises a display screen; the operation device is used to output an operation instruction; the host is electrically connected to the display device and the operation device, is connected to an Electronic Control Unit (ECU) of a vehicle to obtain the driving information, and has an interface generating device. The interface generating device divides the driving information into plural shown information and plural hidden information according to the operation instruction, the shown information is added to a custom page transmitted to the display device, a setting page which is displayed by the display device is replaced from an initial page to the custom page, so as to show the driving information which is chosen by an user.

In one preferred embodiment, the display device comprises an indicator. The host generates an indicator information applied to the indicator according to the driving information, and controls the indicator to show the shown information according to the indicator information.

In the preferred embodiment, the host further comprises a brightness control unit. The brightness control unit is coupled with the display device and controls the brightness change of the display device according to one of the driving information and the operation instruction.

In the preferred embodiment, the steering wheel includes an alarm device, and the alarm device operates according to a setting condition input by the user and alarm information generated by the driving information.

In the preferred embodiment, the steering wheel further includes a wireless transceiver for connecting with an on-board diagnostic system (OBD) of the ECU to obtain the driving information.

In the preferred embodiment, the host comprises a storage unit. The storage unit is used to store the initial page and the custom page generated by the interface generating device, so that the user can choose the content of the setting page according to requirements.

As can be seen from above explanation, the invention is characterized in that the steering wheel can generate a customized interface needed by the user from a variety of driving information provided by the vehicle and display it on the screen through the interface generating device. It is convenient for users to generate a customized display interface according to their driving habits or information needs.

DETAILED DESCRIPTION OF PREFERRED EMBODIMENTS

Figure 1:
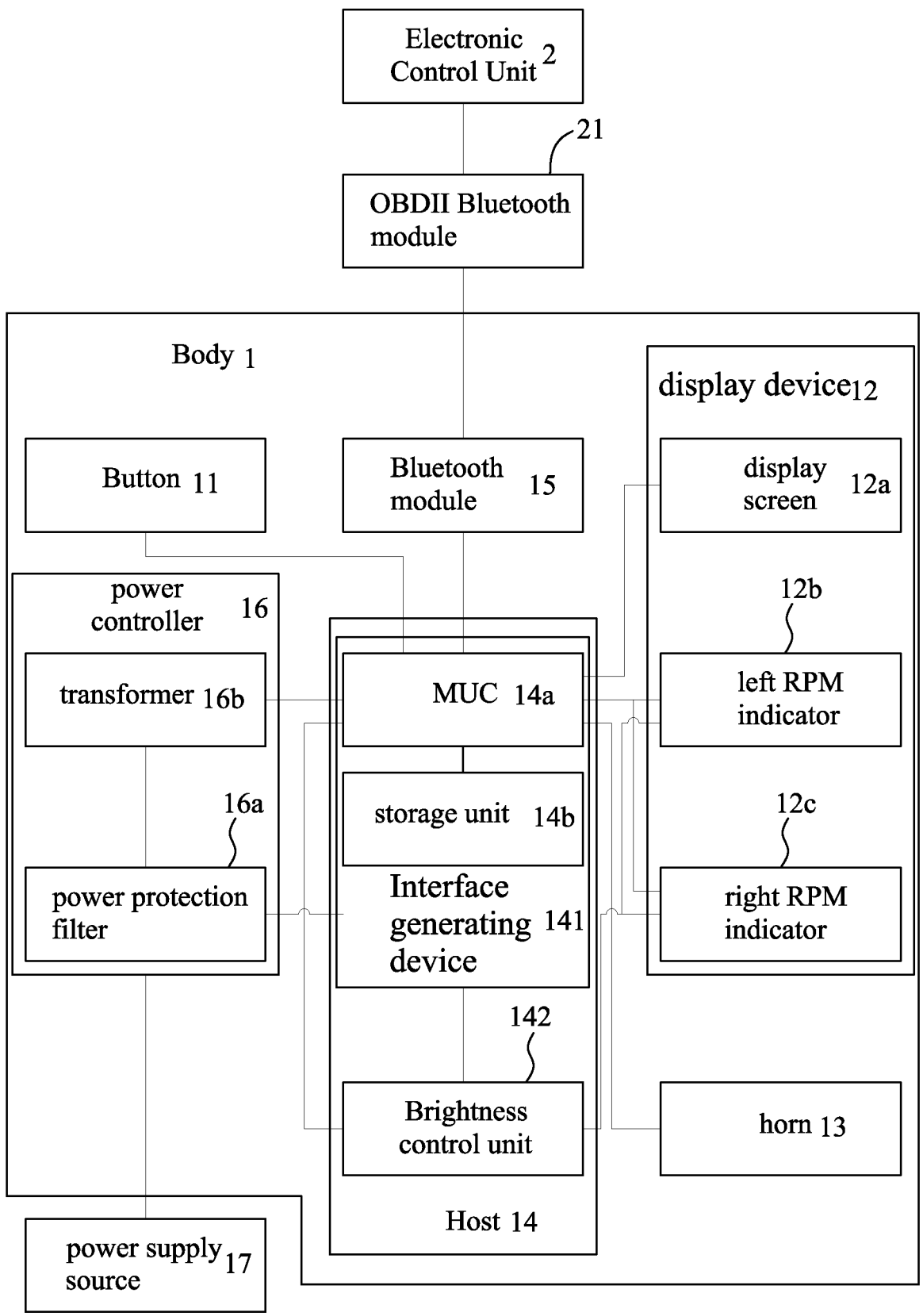
FIG. 1 is a schematic illustrating hardware block diagram of a steering wheel according to a preferred embodiment of the present invention.
Figure 2:
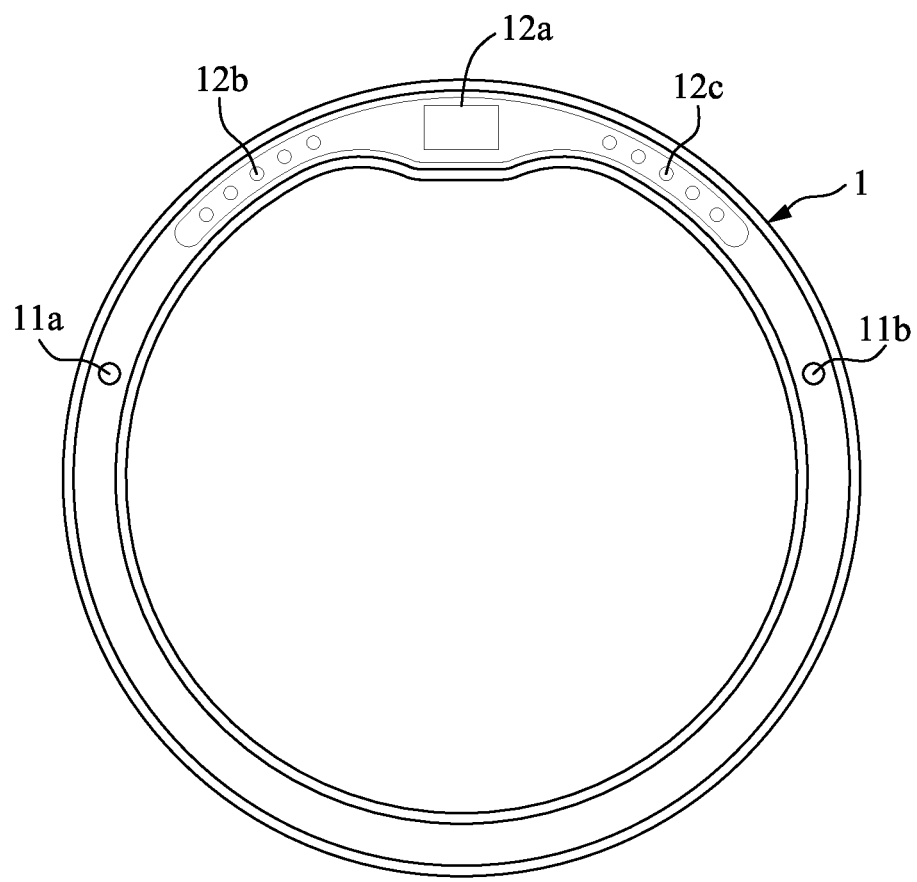
FIG. 2 is a schematic illustrating the device of a steering wheel of FIG. 1.

In order to further understand the structure, usage and features of the present invention more clearly and detailedly, the present invention is described in detail below with references to the accompanying drawings and specific preferred embodiments:

Please refer to FIGS. 1 and 2. In a preferred embodiment according to the present invention, the steering wheel includes a body 1 which is coupled with an on-board diagnostics second generation (hereinafter referred to as OBDII) on an Electronic Control Unit (ECU) 2 of a vehicle. The body 1 comprises: a set of buttons 11 as an operation device (left button 11a and right button 11b shown in FIG. 2); a display device 12 including a display screen 12a, a left RPM indicator 12b, and a right RPM indicator 12c; a horn 13 as an alarm device; a host 14; a Bluetooth module 15 including a wireless transceiver; and a power controller 16.

The host 14 includes an interface generating device 141 and a brightness control unit 142. The interface generating device 141 includes an MCU 14a and a storage unit 14b. The interface generating device 141 is coupled with the Bluetooth module 15, the brightness control unit 142, the power controller 16, the operation device, the display device 12, and the horn 13.

The power controller 16 is used to obtain power provided by an external power source. The power controller 16 includes a power protection filter 16a and a transformer 16b. As shown in the figure, in the embodiment according to the present invention, the external power will be provided to the host 14 after being processed by the power protection filter 16a, and the power provided to the MCU 14a of the host 14 will be further stepped down by the transformer 16b after passing through the power protection filter 16a; in different embodiments according to the present invention, the external power source can be provided by the power system of the vehicle itself or other external power source, or yet other conventional power equipment of on-board devices.

Functionally, the interface generating device 141 is connected to a OBDII Bluetooth module 21 which is coupled with the OBDII through the Bluetooth module 15 to obtain a plurality of driving information; according to the operation input on the buttons 11 from the user, divides the driving information into a plurality of shown information that is desired to be displayed on the display device 12 and a plurality of hidden information that is not to be displayed on the display device 12; the shown information is added to a custom page transmitted to the display device 12; a setting page which is displayed by the display device 12 is replaced from an initial page to the custom page; and then the shown information is shown via the display screen 12a and the RPM indicators 12b, 12c. Because the OBDII can be an existing device, the present steering wheel can be applied to different types of vehicles with the device.

Wherein, the storage unit 14b can store the initial page and the custom page generated by the interface generating device 141, so that the user, according to demand, to choose whether the content of the setting page is the newly generated custom page or the existing custom page or the initial page after the setting page is replaced.

Wherein, the shown information may be image information displayed through the display screen 12a, or light information shown through light change of the RPM indicators 12b, 12c (controlled in conjunction with the brightness control unit 142), or sound information provided by the horn 13.

The host 14 can further generate alarm information for activating the horn 13 according to a setting condition input by the user through the operation device and the driving information (including shown information), and the horn 13 will generate a warning sound to the user after receiving the alarm information.

As can be seen from above, the steering wheel of the present invention, through the interface generating device 141 therein, according to demand of the user, can generate a customized interface (the custom page) which the user needs from a variety of driving information provided by the vehicle and display the customized interface on the screen. It is convenient for users to generate a customized display interface according to their driving habits or information needs.

Figure 3:
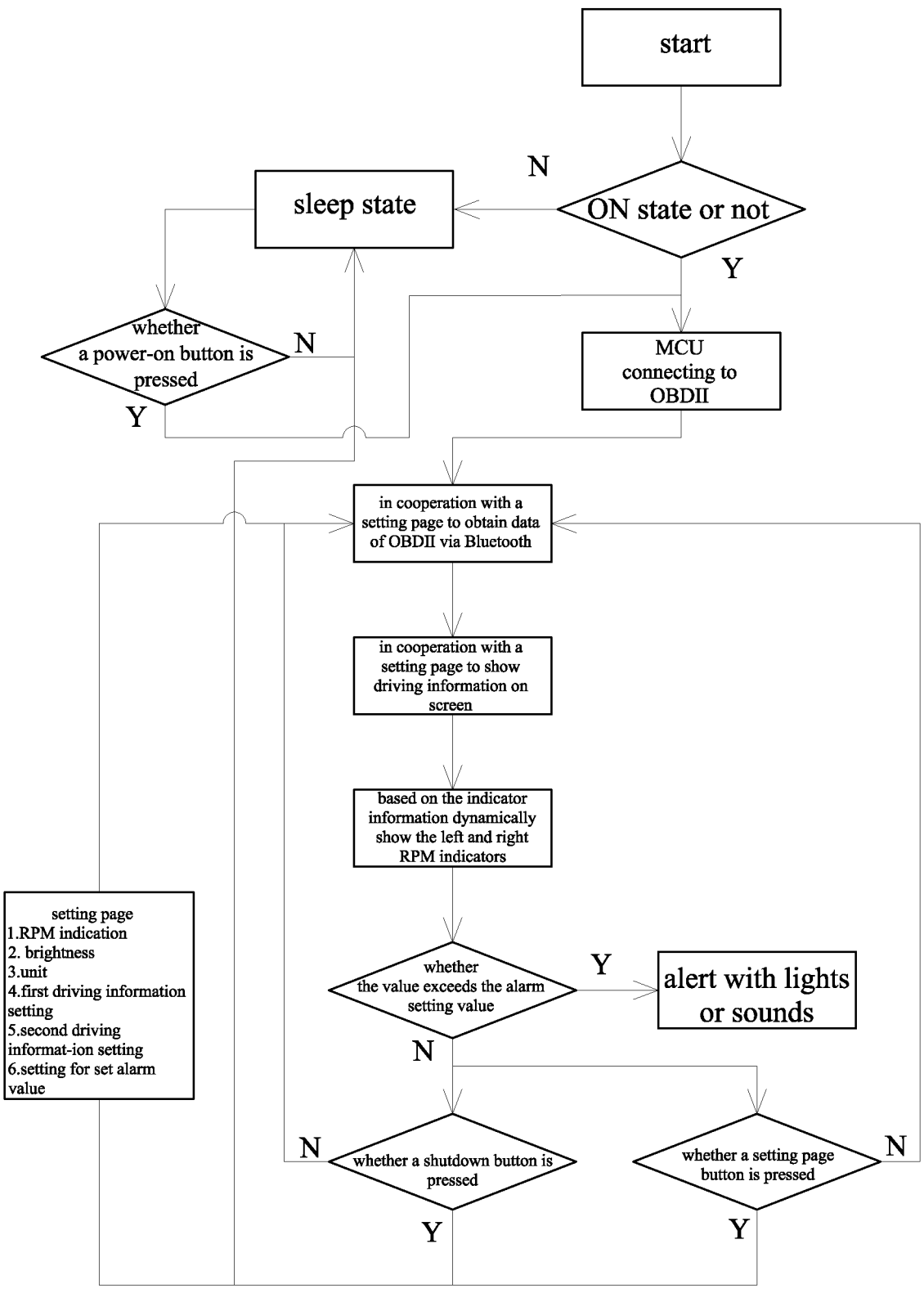
FIG. 3 is a schematic illustrating flow chart of the operation of the host in the steering wheel of the present invention.

Regarding the operation mode of the host 14, please refer to FIG. 3. In the present embodiment, first the host 14 will confirm whether itself is in a power-on state, if not, the host 14 will determine that it is in a sleep state, and then decide whether to continuously stay in the sleep state according to whether a power-on button is pressed (not shown), or allow the MCU 14a of the interface generating device 141 to connect with OBDII of the vehicle through the Bluetooth module 15, and transmit a key stored in the storage unit 14b to QBDII for authentication, so as to facilitate the subsequent steps of obtaining the driving information of the vehicle through OBDII.

After that, the interface control unit, in cooperation with the setting of a setting page, divides a variety of driving information obtainable through OBDII into the shown information and the hidden information, and obtains the display information. On the display device 12 (including the display screen 12a and the left/right RPM indicators 12b, 12c), the driving information belonging to the shown information is displayed thereon.

Wherein, when the device of the present invention is used for the first time before sale, the setting page is preset by the manufacturer of the host 14 as the initial user and stored in the original page of the storage unit 14b. Then, the setting page changes to the custom page according to the setting of operation instruction input by the user; the driving information that can be set whether to be displayed on this setting page can include: RPM indication, brightness, unit, a first driving information setting, a second driving information setting, and the setting conditions as set alarm value.

In the present invention, there is no limit on the manner in which the interface generating device 141 obtains the driving information displayed on the display screen 12a. The manner may be based on the settings of the setting page, and the driving information classified as the shown information is only obtained through the Bluetooth module 15 after the available driving information is first divided into the shown information and the hidden information. The manner may also be to obtain all driving information and then decide whether to display it on the display screen 12a according to whether the driving information is shown information.

When the driving information showed through the left and right RPM indicators 12b, 12c according to the control of the host 14, the left and right RPM indicators 12b, 12c will, based on the indicator information generated by the host 14 according to the driving information and a setting of set RPM indication, dynamically show the left and right RPM indicators 12b, 12c. For example, when the engine RPM increases, to control the brightness or of the left RPM indicator 12b, or to increase or decrease the number of luminous bulbs.

Then, according to the setting conditions input by the user and the driving information, the host 14 judges whether the value of the driving information exceeds the set alarm value in the setting conditions to determine whether to generate the alarm signal for activating the horn 13 or control the display device 12 to alert the user.

Finally, the host will judge whether the user presses a shutdown button (not shown) to enter the sleep state, or continuously in cooperation with the display settings on the setting page to show the driving information.

When the user wants to change the setting page, the host 14 will determine whether to allow the user to reset the content of the setting page (i.e., conditions used to differentiate the shown information from the hidden information) according to whether the user presses a setting page button (belonging to the operation device).

In addition, with regard to the driving information, the present invention does not limit the type of the driving information. It can be the driving information obtained from the ECU 2, or through other methods, such as the driving information from additional external sensors installed by the user oneself. In addition, in some embodiments, the driving information may also be the driving information generated after the host 14 calculates information provided by the ECU 2.

The above-instanced embodiments are used for conveniently describing the present invention, not further to limit it. For the person skilled in the art of the disclosure, without departing from the concept of the disclosure, simple modifications or changes can be made and should be included in the following claims and their equivalents of the present application.

What is claimed is:

1. A steering wheel system for showing a plurality of pieces of driving information of a vehicle, the vehicle having an Electronic Control Unit (ECU) that includes an on-board diagnostics second generation (OBD-II) system, the steering wheel system comprising:
   an OBD-II Bluetooth module for connecting with the OBD-II system of the ECU; and
   a steering wheel, comprising:
      a display device, comprising a display screen for displaying a setting page and a plurality of indicators;

an operation device, used to output a first operation instruction and a second operation instruction;

a Bluetooth module for connecting with the OBD-II Bluetooth module to obtain the driving information from the Electronic Control Unit;

a host, electrically connected to the display device, the operation device and the Bluetooth module, wirelessly connected to the ECU of the vehicle to obtain the driving information via the Bluetooth module, and having an interface generating device and a brightness control unit, the brightness control unit being coupled with the display device and controlling a brightness change of the display device;

a storage unit, used to store an initial page, a custom page generated by the interface generating device and a key, the key being transmitted to the QBD-II Bluetooth module through the Bluetooth module for allowing the interface generating device to connect with the OBDII system of the vehicle;

a power controller, used to obtain, filter and transform power provided by an external power source, the power controller including a power protection filter and a transformer, such that external power is provided to the host after being processed by the power protection filter, and is subsequently provided to the interface generating device after being further stepped down by the transformer; and an alarm device, operating according to a setting condition input by a user, to thereby generate an alert of a horn and alarm information of the displayer device when a value of the driving information exceeds a set alarm value in the setting condition, wherein the interface generating device divides the driving information obtained from the Electronic Control Unit into a plurality of pieces of shown information and a plurality of pieces of hidden information, after the interface generating device receives the first operation instruction, the shown information is added to the custom page transmitted to the display device, the setting page which is displayed by the display device is replaced from the initial page to the custom page after the interface generating device receives the second operation instruction, so as to allow a user to choose a content of the setting page and to allow the display screen to show the driving information which is chosen by the user, and the host generates indicator information applied to the indicators according to the driving information, the indicators being controlled to show light information for light change according to the indicator information.

* * * * *